United States Patent
Chuo et al.

(10) Patent No.: US 9,850,996 B2
(45) Date of Patent: Dec. 26, 2017

(54) MOTOR INCORPORATING REDUCER

(71) Applicant: HIWIN TECHNOLOGIES CORP., Taichung (TW)

(72) Inventors: Yung-Tsai Chuo, Taichung (TW); Po-Jung Huang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 371 days.

(21) Appl. No.: 14/689,643

(22) Filed: Apr. 17, 2015

(65) Prior Publication Data

US 2016/0305527 A1   Oct. 20, 2016

(51) Int. Cl.
| | |
|---|---|
| *H02K 7/06* | (2006.01) |
| *F16H 49/00* | (2006.01) |
| *H02K 7/116* | (2006.01) |
| *H02K 11/21* | (2016.01) |
| *B25J 9/10* | (2006.01) |
| *B25J 9/12* | (2006.01) |
| *H02K 7/08* | (2006.01) |

(52) U.S. Cl.
CPC .......... *F16H 49/001* (2013.01); *B25J 9/1025* (2013.01); *B25J 9/126* (2013.01); *H02K 7/116* (2013.01); *H02K 11/21* (2016.01); *H02K 7/083* (2013.01)

(58) Field of Classification Search
CPC  H02K 6/20; H02K 7/16; H02K 7/083; H02K 11/21; F16H 49/001; F16H 2049/003
USPC .......................................................... 310/83
See application file for complete search history.

(56) References Cited

U.S. PATENT DOCUMENTS

| | | | |
|---|---|---|---|
| 2,906,143 A  * | 9/1959 | Walton ................... | F16H 49/001 285/276 |
| 6,477,918 B2 * | 11/2002 | Sakamoto .............. | F16M 11/18 475/149 |
| 6,629,905 B1 * | 10/2003 | Sesselmann .......... | E05F 11/483 254/344 |
| 2014/0283638 A1* | 9/2014 | Yajima ................... | H02K 7/116 74/412 R |

* cited by examiner

*Primary Examiner* — Hanh Nguyen
(74) *Attorney, Agent, or Firm* — Muncy, Geissler, Olds & Lowe, P.C.

(57) ABSTRACT

A motor-incorporating reducer includes a main body, a rotational actuating member, a flex spline, and an circular spline. The rotational actuating member has a rotating shaft, a wave generator, and a motor. The rotating shaft passes through the main body, and the elliptic wheel is integratedly formed around the rotating shaft. The motor has a magnetic motor rotator that is integratedly formed on the rotating shaft. With the integrated structure, the rotating shaft, the elliptic wheel, and the motor rotator can stably perform rotation, thereby eliminating the risk that the three, when formed separated and assembled, would become non-coaxial due to the resultant tolerance after assembly and have eccentric rotation, and in turn preventing adverse effects on the drive's output torque due to non-coaxial rotation and extending the drive's service life.

6 Claims, 4 Drawing Sheets

MOTOR INCORPORATING REDUCER

BACKGROUND OF THE INVENTION

1. Technical Field

The present invention relates to a motor-incorporating reducer, which eliminates the risk of non-coaxial rotation of assembled components and thereby ensuring the drive's output torque and service life.

2. Description of Related Art

With the development of technology, mechanical automation has become a popular approach to saving labor costs and bringing great convenience to industry and human life. In general machinery, such as robots, robotic arms, machine tools and automated production systems, a driving assembly is typically used to provide rotational power. Such a driving assembly consists of a reducer and a motor. Therein, a harmonic gear reducer, as compared to transmission mechanism using normal gears, has the advantages of high kinematic accuracy, high transmission ratio, light weight, high compactness and high loading capacity, and is extensively used in automated machinery.

Two known applications of the combination between a harmonic gear reducer and a motor are discussed herein. The first conventional device has its rotatory transmission shaft coaxially passing through a hollow motor shaft and extending outward, and has an output shaft sensor located at a rear opening at the hollow motor shaft and on a rear end of the rotatory transmission shaft protruding rearward. Since the motor rotator and the rotating shaft are two separated produced parts, when they are assembled, the resultant tolerance can make the motor rotator and the rotating shaft have non-coaxial rotations. In addition, the sensors for sensing the input and output angles are both located at the rear end of the motor rotator, so that overall drive is hard to be downsized and becomes bulky.

The second conventional device has its rotating shaft passing through the interior of the reducer and coaxially assembled to a wave generator, and has a rotary encoder installed on the rotating shaft corresponding to the rotary position sensor. Since the wave generator and the rotating shaft are two separated produced parts, when they are assembled, the resultant tolerance can cause non-coaxial rotations. Moreover, the rotary encoder installed on the rotating shaft can only read the input rotational speed.

BRIEF SUMMARY OF THE INVENTION

As stated, the prior-art devices have their components and the rotating shaft produced separately, so the resultant tolerance after assembly can make the assembled components and the rotating shaft become non-coaxial and cause related problems.

Hence, the present invention provides a motor-incorporating reducer with the primary objective to improve the shortcomings of the prior art by having its rotating shaft, motor rotator and wave generator formed integratedly and coaxially.

Another objective of the present invention is to add detecting sets for detecting rotary angles of the rotating shaft at its input and output ends without adding the volume of the drive.

For achieving the foregoing objectives, the disclosed motor-incorporating reducer comprises a main body, a rotational actuating member, a flex spline, and an circular spline. The rotational actuating member is installed in the main body. The rotational actuating member has a rotating shaft, a wave generator, and a motor. The rotating shaft passes through main body. The rotating shaft has a first end and a second end opposite to the first end. The wave generator comprises an elliptic wheel. The elliptic wheel is integratedly formed around rotating shaft and is close to the first end of the rotating shaft. The motor comprises a motor stator encircling the rotating shaft and being close to rotating shaft second end, and a magnetic motor rotator. The motor rotator is integratedly formed on the rotating shaft and is close to rotating shaft second end. The motor rotator corresponds to the motor stator. Thereby, the rotating shaft, the wave generator, and the motor rotator can coaxially rotate and ensure good torque output by eliminating the tolerance-related problem seen in the prior art. The flex spline is provided on the periphery of the elliptic wheel. The elliptic wheel drives the flex spline to move. The circular spline is mounted around the flex spline. The flex spline and the circular spline partially engage with each other. Thereby, the rotational actuating member drives the flex spline to rotate and engage with the circular spline for transmission, so as to give speed-reducing effects.

The invention as well as a preferred mode of use, further objectives and advantages thereof will be best understood by reference to the following detailed description of illustrative embodiments when read in conjunction with the accompanying drawings.

DETAILED DESCRIPTION OF THE INVENTION

For further illustrating the means and functions by which the present invention achieves the certain objectives, the following description, in conjunction with the accompanying drawings and preferred embodiments, is set forth as below to illustrate the implement, structure, features and effects of the subject matter of the present invention.

Figure 1:
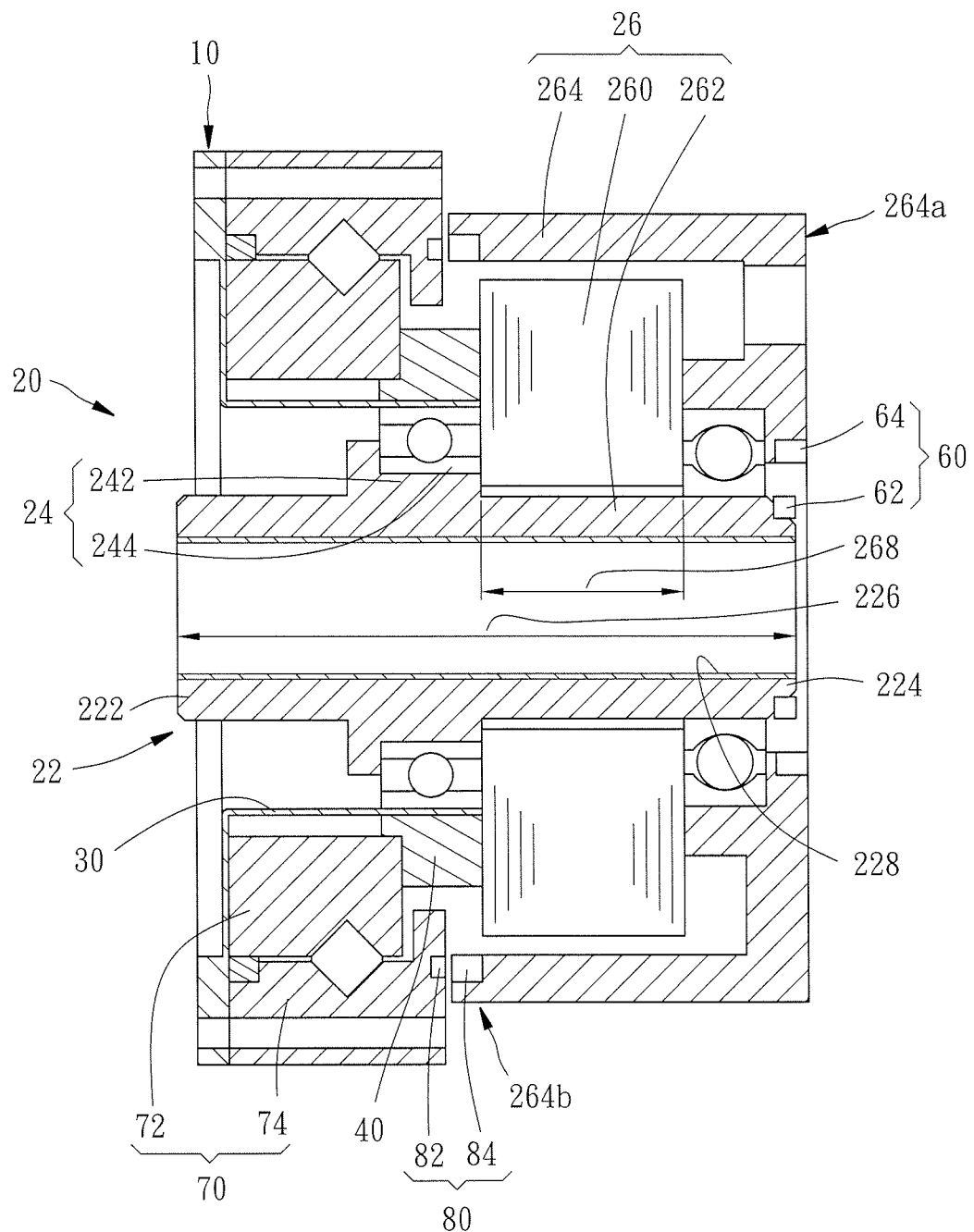
FIG. 1 is a cross-sectional view of a reducer according to a preferred embodiment of the present invention.

Referring to FIG. 1, in a preferred embodiment of the present invention, a motor-incorporating reducer comprises a main body 10, a rotational actuating member 20, a flex spline 30, an circular spline 40, a first detecting set 60, a roller bearing 70, and a second detecting set 80. The rotational actuating member 20 is installed inside the main body 10 and has a rotating shaft 22, a wave generator 24, and a motor 26.

The rotating shaft 22 passes through the main body 10 and has a first end 222 and a second end 224 opposite to the first end 222. The wave generator 24 comprises an elliptic wheel 242 and a flexible bearing 244. The elliptic wheel 242 is integratedly formed around the rotating shaft 22 and is close to the first end 222 of the rotating shaft 22. The flexible bearing 244 is mounted around the elliptic wheel 242.

The motor 26 comprises a motor stator 260 that is mounted around the rotating shaft 22 and is close to the second end 224 of the rotating shaft 22, a motor rotator 262 that is magnetic, and a motor housing 264. The motor rotator 262 is integratedly formed at the central section of the rotating shaft 22 and is close to the second end 224 of the rotating shaft 22. The motor rotator 262 corresponds to the motor stator 260. The motor housing 264 encloses the rotating shaft 22 from outside, and the rotating shaft 22 is rotatable with respect to the motor housing 264. The motor rotator 262 is located inside the motor housing 264.

The rotating shaft 22 defines an axial length 226, and the motor rotator 262 defines an axial length 268. A ratio between the axial length 226 of the rotating shaft 22 and the axial length 268 of the motor rotator 262 in range of 0.25 and 0.4.

The flex spline 30 is mounted around the elliptic wheel 242 and has one end abutting against the outer ring of the flexible bearing 244 while the elliptic wheel 242 abuts against the inner ring of the flexible bearing 244. The circular spline 40 is made of a rigid material and is mounted around the flex spline 30, such that the flex spline 30 and the circular spline 40 partially engage with each other. The flex spline 30 and the circular spline 40 have the same modulus, and a tooth number difference between the flex spline 30 and the circular spline 40 is 2.

When operating, the elliptic wheel 242 uses its major-axis region to push some of the external teeth of the flex spline 30 to fully engage with the internal teeth of the circular spline 40, so that the externally toothed transmission member 30 is driven to rotate along its periphery.

The roller bearing 70 comprises an inner ring 72 and an outer ring 74. The inner ring 72 has one end abutting against the circular spline 40 and an opposite end abutting against the flex spline 30. The outer ring 74 has one end connected to the flex spline 30.

Figure 2:
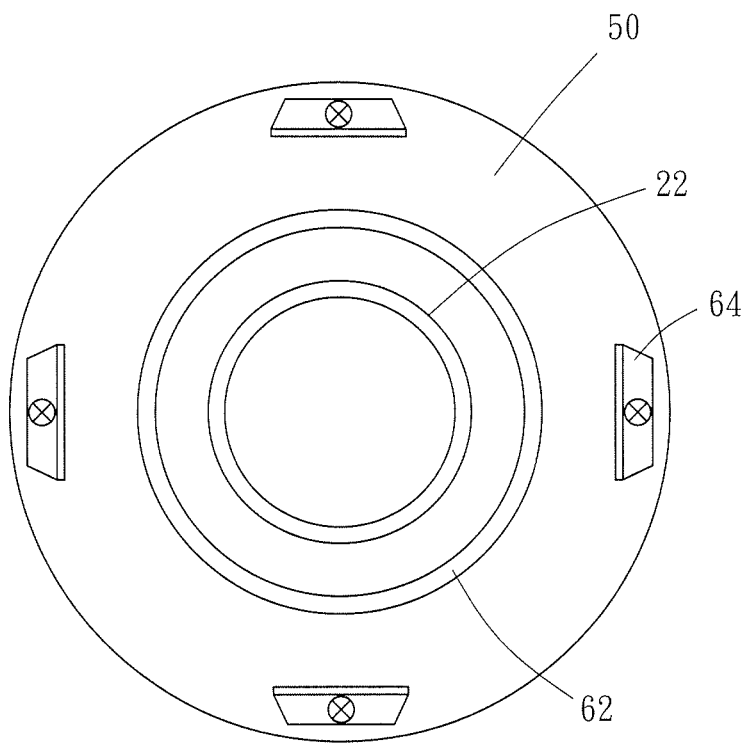
FIG. 2 is a cross-sectional view of the reducer, showing the configuration of its input end sensor and input end encoder.

The first detecting set 60 comprises a first encoder 62 and at least one first sensor 64. The first encoder 62 encircles the second end 224 of the rotating shaft 22, and the first sensor 64 is located at the rear end 264*a* of the motor housing 264. The amount of the first sensors 64 is of an even number. Each two of the first sensors 64 are symmetrically arranged on the periphery of the rear end 264*a* of the motor housing 264. As depicted in FIG. 2, there are four, said first sensors 64 arranged as two pairs. The first sensor 64 corresponds to the first encoder 62 for reading out the rotatory displacement and rotational speed of the rotating shaft 22.

The second detecting set 80 comprises a second encoder 82 and at least one second sensor 84. The at least one second sensor 84 encircles the front end 264*b* of the motor housing 264. The second encoder 82 is located at one end of the outer ring 74 of the roller bearing 70 and corresponds to the second sensor 84. The amount of the second sensors 84 is of an even number. Each two of the second sensor 84 are symmetrically arranged on the periphery of the front end 264*b* of the motor housing 264. Since the arrangement of the second sensor 84 is similar to that of the first sensor 64 and can be easily understood by referring to FIG. 2, no reiterative drawing is provided herein. The second sensor 84 serves to read out the rotatory displacement and rotational speed of the roller bearing 70.

Figure 3:
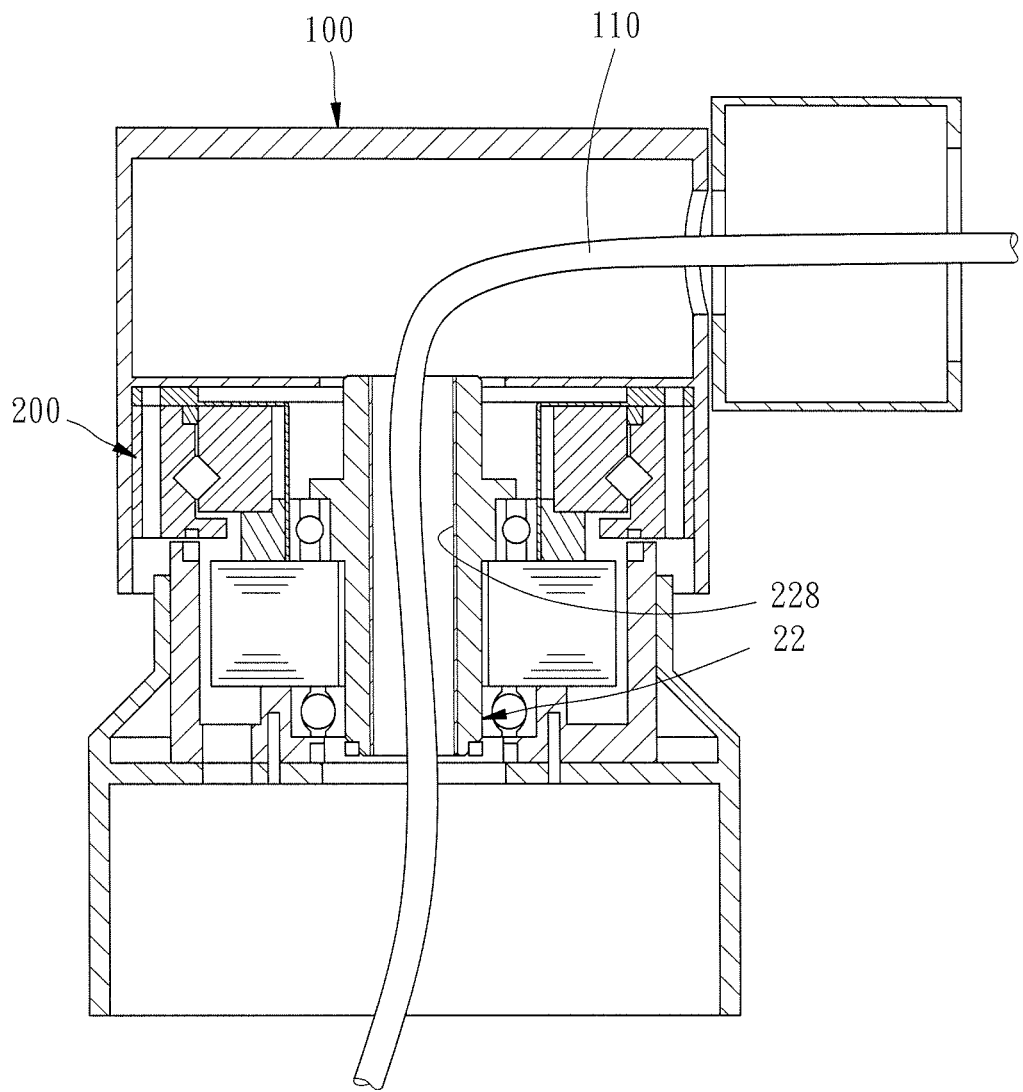
FIG. 3 is a cross-sectional view of the reducer, showing it installed in a robotic arm housing.
Figure 4:
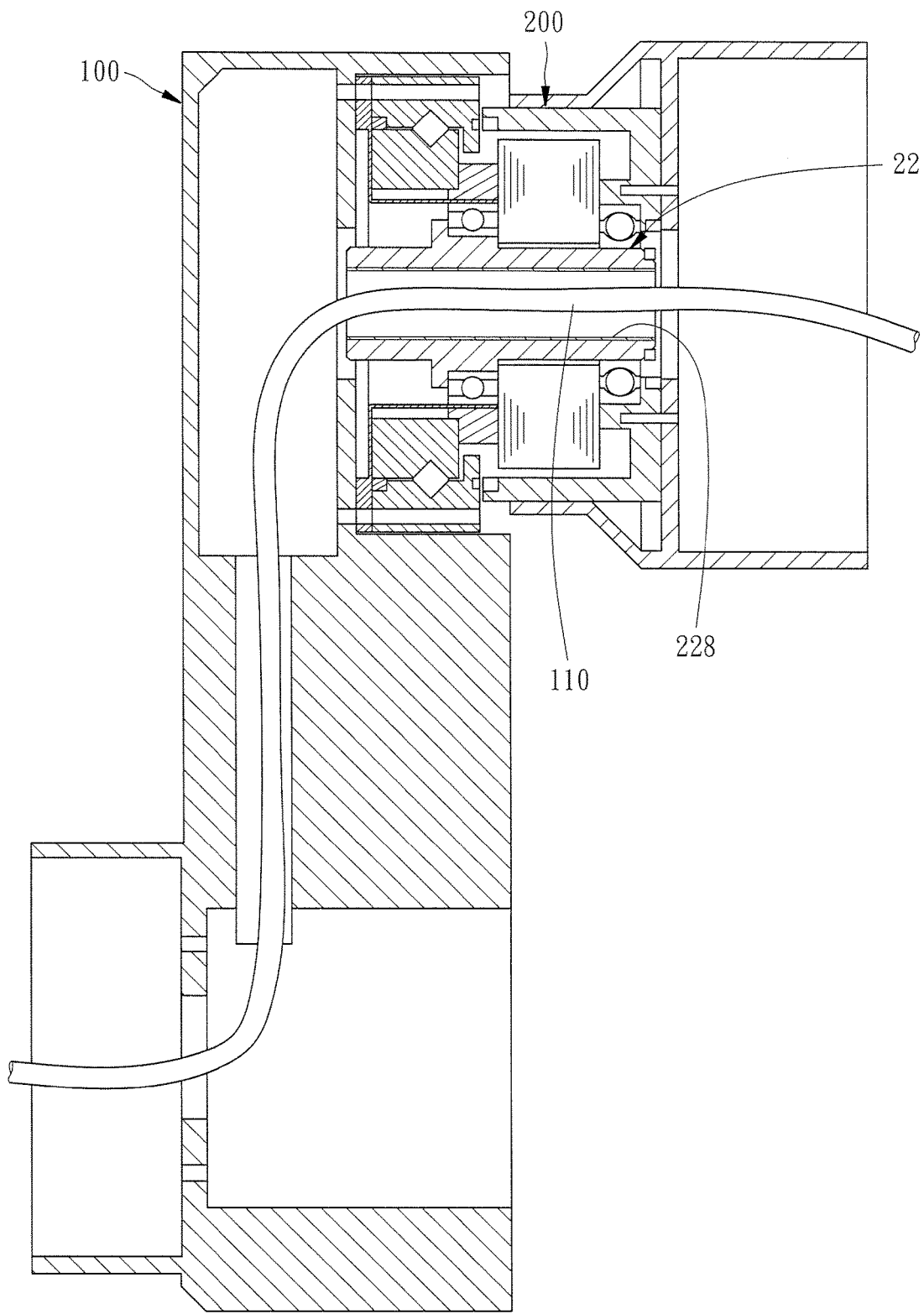
FIG. 4 is a cross-sectional view of the reducer, showing it installed in a different a robotic arm housing.

In addition, referring to FIG. 3 and FIG. 4, the present invention is applied to a robotic arm 100. For allowing the power cord 110 for electrical transmission can pass through the disclosed reducer 200, the rotating shaft 22 is axially formed with a cord channel 228. As shown in the drawing, the power cord 110 of the robotic arm 100 can pass through the cord channel 228 to run from one end of the robotic arm 100 via the rotating shaft 22 to an opposite end of the robotic arm 100.

To sum up, the present invention use the integratedly formed structure of the rotating shaft 22, the elliptic wheel 242 and the motor rotator 26 to eliminate the risk that the three, when formed separated and assembled, would become non-coaxial due to the resultant tolerance after assembly and have eccentric rotation. With the disclosed integratedly formed structure, the elliptic wheel 242 can apply stable and even force to the flex spline 30, making the engagement between the flex spline 30 and the circular spline 40 reliable. This is helpful to improve the service life of both the flex spline 30 and the circular spline 40, and to improve the rigidity of the disclosed drive as a whole while preventing adverse effects on the drive's output torque due to non-coaxial rotation and extending the drive's service life. Moreover, since the second encoder 82 of the second detecting set 80 and the first encoder 62 of the first detecting set 60 are provided on the outer ring 74 of the roller bearing 70 and the rotating shaft 22, respectively, they can simultaneously perform accurate measurement on the rotational speeds and angles of the rotating shaft 22 and the roller bearing 70, without making the drive additionally bulky.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A motor-incorporating reducer, comprising:
a main body;
a rotational actuating member, being installed in the main body and the rotational actuating member having a rotating shaft, a wave generator, and a motor, the rotating shaft passes through main body, rotating shaft having a first end and a second end opposite to the first end, the wave generator comprising an elliptic wheel, the elliptic wheel being integratedly formed around the rotating shaft and close to the first end of the rotating shaft, the motor comprising a motor stator around the rotating shaft and close to the second end, and a motor rotator that is magnetic, and the motor rotator being integrated with the rotating shaft and corresponding to the motor stator, wherein the motor comprises a motor housing enclosing the rotating shaft from outside, the rotating shaft being rotatable with respect to the motor housing, the motor rotator being located inside the motor housing;
a flex spline, being mounted around the elliptic wheel, so that the elliptic wheel drives the flex spline to move;
an circular spline, being mounted around the flex spline so that the flex spline and the circular spline partially engage with each other;
a first detecting set, comprising a first encoder and at least one first sensor, the first encoder being located on a periphery of the second end of the rotating shaft, the at least one first sensor being located on a rear end of the motor housing, and the at least one first sensor corresponding to the first encoder so as to read out a rotary displacement in terms of angle of the rotating shaft;
a roller bearing comprising an inner ring and an outer ring, the inner ring having one end abutting against the circular spline and the outer ring having one end connected to the flex spline; and a second detecting set comprising a second encoder and the at least one second sensor, the at least one second sensor being located on a front end of the motor housing, the second encoder being located on an end of the outer ring that is opposite to an end of the outer ring connected to flex spline, and the at least one second encoder corresponding to the at least one second sensor.

2. The motor-incorporating reducer of claim 1, wherein each of the rotating shaft and the motor rotator defines an axial length, and a ratio between the axial length of the magnetic motor rotator and the axial length of the rotating shaft in range of 0.25 and 0.4.

3. The motor-incorporating reducer of claim 1, wherein an amount of the at least one first sensor is of an even number, and each two said first sensors are arranged symmetrically on a periphery of the rear end of the motor housing.

4. The motor-incorporating reducer of claim 1, wherein an amount of the at least one second sensor is of an even number, and each two said second sensors are arranged symmetrically on a periphery of the front end of the motor housing.

5. The motor-incorporating reducer of claim 1, wherein the rotating shaft is axiall formed with a cord channel.

6. The motor-incorporating reducer of claim 1, wherein the flex spline and the circular spline have an identical modulus, and a tooth number difference between the flex spline and the circular spline is 2.

* * * * *